United States Patent [19]
Smith et al.

[11] Patent Number: 5,954,890
[45] Date of Patent: Sep. 21, 1999

[54] COMPOSITIONS AND METHODS FOR COATING REMOVAL

[75] Inventors: Pat E. Smith, San Antonio; John M. Jasper, Schertz; William R. Zinnecker; Joe R. Fredricksen, both of San Antonio, all of Tex.

[73] Assignee: Eldorado Chemical Co., Inc., San Antonio, Tex.

[21] Appl. No.: 08/938,222

[22] Filed: Sep. 26, 1997

Related U.S. Application Data

[62] Division of application No. 08/549,495, Oct. 27, 1995, Pat. No. 5,830,836.

[51] Int. Cl.$^6$ ............................... B08B 3/08; C09D 9/00; C01B 15/00

[52] U.S. Cl. .................... 134/38; 134/2; 134/34; 252/186.25; 252/186.26; 252/186.28; 252/186.33; 252/186.42; 252/186.43; 510/201; 510/202; 510/203; 510/212; 510/311; 510/364

[58] Field of Search ............ 252/186.25, 186.26, 252/186.28, 186.29, 186.33, 186.42, 186.43; 134/2, 4, 34, 38; 510/201, 202, 203, 206, 207, 208, 209, 212, 309, 311, 364, 505, 507, 508

[56] References Cited

U.S. PATENT DOCUMENTS

| | | | |
|---|---|---|---|
| 3,156,654 | 11/1964 | Konecny | 252/186.31 |
| 3,285,777 | 11/1966 | Grafton et al. | 134/2 |
| 3,355,385 | 11/1967 | Mackley | 134/2 |
| 3,654,940 | 4/1972 | Ritzi | 134/2 |
| 3,926,718 | 12/1975 | Guilbault et al. | 162/168 |
| 4,578,206 | 3/1986 | Walker | 252/186.43 |
| 4,612,058 | 9/1986 | Geke et al. | 134/38 |
| 4,620,935 | 11/1986 | Baxter et al. | 252/186.33 |
| 4,626,374 | 12/1986 | Finch et al. | 252/186.25 |
| 4,645,617 | 2/1987 | Vivian | 134/38 |
| 4,728,455 | 3/1988 | Rerek | 252/186.26 |
| 4,749,510 | 6/1988 | Nelson | 134/38 |
| 5,073,289 | 12/1991 | Collier et al. | 510/205 |
| 5,098,591 | 3/1992 | Stevens | 510/106 |
| 5,098,592 | 3/1992 | Narayanan et al. | 134/38 |
| 5,106,525 | 4/1992 | Sullivan | 134/38 |
| 5,215,675 | 6/1993 | Wilkins et al. | 134/2 |
| 5,454,985 | 10/1995 | Harbin | 134/38 |
| 5,542,986 | 8/1996 | Distaso | 134/38 |
| 5,725,678 | 3/1998 | Cannon et al. | 134/1 |

FOREIGN PATENT DOCUMENTS 0 497 130 B1  8/1992  European Pat. Off. .

OTHER PUBLICATIONS

Graco, Inc. Parts List for Plural Component Proportioning Pump, published 1994 or earlier.

Military Specification (Cancelled), "Remover, Paint, Non-flammable, Water Rinsable," MIL–R–8633A(Aer), Oct. 24, 1956, Superseding MIL–R–8633 (Aer), Aug. 18, 1953.

Military Specification, "Remover, Pain; Organic, Solvent Type," MIL–R–46073A(ME), May 31, 1967, Superseding MIL–R–46073(MO), Dec. 3,1963.

Military Specification, "Remover, Acid Activated, for Amine–Cured Epoxy Coating Systems," MIL–R–1903 (AS), May 26, 1972.

*Primary Examiner*—Joseph D. Anthony
*Attorney, Agent, or Firm*—Akin Gump Strauss Hauer & Feld

[57] ABSTRACT

Compositions and methods for removal of polymeric coatings from nonporous surfaces are provided. The method comprises the mixing of two stock solutions, a peroxide/acid solution and an alkaline solution, and immediate application to the surface to be stripped of coating. The applied mixture produces a controlled peroxide oxidation reaction causing the coating to become softened-to-release. A further step of washing or blowing with water, air, cornstarch, or plastic media will remove the softened-to-release coating. The two stock solutions are stable to storage and, when in use, are continuously mixed in a volume so as to control reaction rate, pH, corrosivity of the coating remover, and reaction rate with the coating.

22 Claims, 1 Drawing Sheet

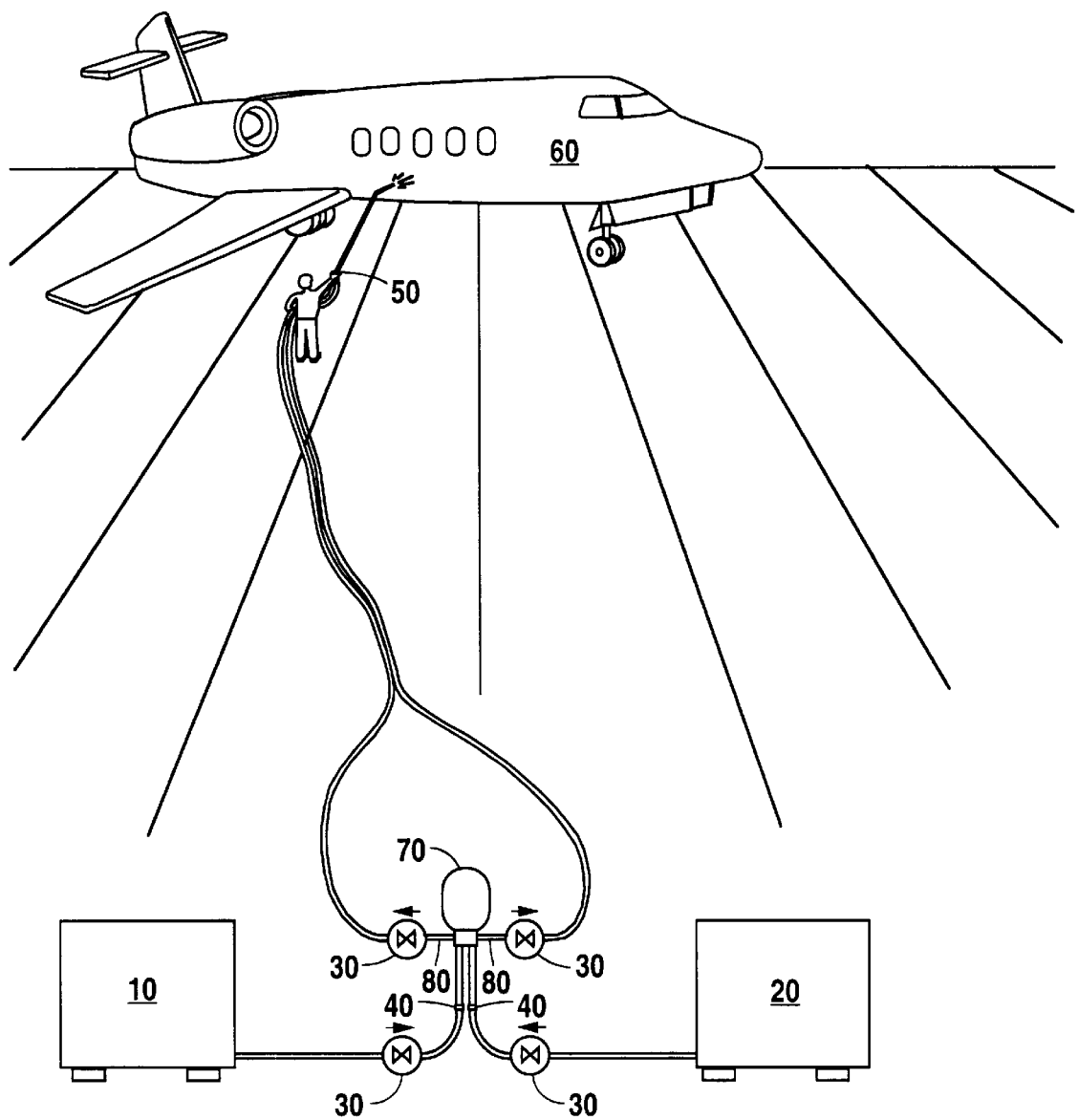

COMPOSITIONS AND METHODS FOR COATING REMOVAL

This application is a divisional application of allowed and U.S. Ser. No. 08/549,495, filed Oct. 27, 1995 now U.S. Pat. No. 5,830,836.

FIELD OF THE INVENTION

The present invention relates to compositions and methods for coating removal from surfaces having a polymeric coating such as paint, varnish, a sealant, or lacquer. More particularly, the present invention provides compositions and methods for coating removal that uses peroxide in a manner that minimizes corrosion of metals, minimizes hazardous reactions, and maximizes shelf life through the use of a complementary two-stock solution system where the stock solutions are mixed immediately prior to use.

BACKGROUND OF THE INVENTION

Paint strippers typically used for removal of polymeric coatings contain solvents, water, surfactants, evaporation retardants, corrosion inhibitors, viscosity modifiers, and activators. Solvents are typically volatile solvents or low-vapor pressure solvents that are biodegradable. Surfactants promote wetting, emulsification flow, and penetration. Evaporation retardants are materials of limited solubility which film out of solution forming a barrier, such as petroleum waxes, petroleum aliphatics, cetyl alcohol, and polyglycols. Viscosity modifiers are predominantly cellulose derivatives, though finely divided silica ground clay and synthetic polymers are also used. Corrosion inhibitors are quite diverse, and specific to the metal involved and the stripper composition. Activators break chemical bonds in polymers by hydrolysis, ester interchange, oxidation or reduction.

The more environmentally acceptable paint removers in use contain low-vapor pressure solvents with ammonia, amines, formic acid or other organic acids. U.S. Pat. No. 5,215,675 to Wilkins et al. relates to a stripping composition containing peroxide, however, the pH of the composition is significantly below the pH of the compositions of the present invention. A low pH is disadvantageous since a surface, especially a metal surface, is corroded by acidic solutions. U.S. Pat. No. 3,654,940 to Ritzi relates to a stripping composition where heat is used to activate the composition, in contrast to the present invention where mixing of the stable stock solutions activates the ingredients. U.S. Pat. No. 3,355,385 to Mackley relates to processes that use hydrogen peroxide as the bond release agent in stripping organic coatings; the compositions are not as stable as those of the present invention, nor do they have pH values as those of the present invention to avoid corrosion of the substrate. In general, peroxide-containing stripping agents have heretofore been somewhat limited in use due to their lack of stability, hazards in use, and corrosiveness to metals; particularly to cadmium-coated fasteners, such as rivets and the landing gears of aircraft.

SUMMARY OF THE INVENTION

The present invention addresses deficiencies in the prior art by providing compositions and methods that allow stable stock solutions to be mixed immediately prior to application to make a composition comprising a peroxide solution having a pH of about 6.5 to 11.0. This composition is capable of softening-to-release a polymeric coating from a hard surface when applied to said coating. "Softening-to-release" means that a polymeric coating on a hard surface becomes nonadherent to the surface and readily removable as a result of contact with the composition. A polymeric coating is an organic coating, and may be paint, enamel, lacquer, varnish, a sealant, or the like. A hard surface is a surface that is substantially nonporous, such as metal, certain stone, acrylic siding, and may be the surface of an aircraft, a car or a building, for example.

The peroxide solution having a pH of about 6.5 to 11.0 is formed by a process of mixing an acid peroxide solution with an alkaline solution containing an oxidation catalyst. The mixing occurs immediately prior to application and at a rate equal to a rate of application. The acid peroxide solution has from about 1% to 30% peroxide by weight, preferably from hydrogen peroxide or methyl ethyl ketone peroxide; other organic peroxides known to one of skill in this art in light of the present disclosure would work also, albeit somewhat less effectively. The alkaline solution is sufficiently alkaline so that when mixed with the peroxide/acid solution, the pH of the mixture is from about 6.5 to 11.0. The oxidation catalyst, at a concentration of at least 0.01% by weight, is capable of enhancing peroxide degradation at a rate appropriate for coating removal and may be sodium molybdate, manganese sulfate, iodine or a heavy metal, such as chromate, or iron, for example. The pH of the alkaline solution may have been adjusted with any of a variety of basic compounds, most commonly, compounds such as sodium hydroxide, ammonia, ammonium hydroxide, or ethanolamine, for example. Buffers, such as a phosphate or carbonate buffer may be included to regulate pH.

The term "peroxide solution having a pH of about 6.5 to 11.0" is equivalent to the term "coating remover" or "paint stripper" for purposes of this disclosure. The coating remover may further contain a thickener at about 0.5–1.5% by weight, such as hydroxypropyl cellulose (e.g., Klucel H), carboxymethyl cellulose, or ethoxy cellulose to avoid diluting a viscous alkaline solution, especially for spraying large objects such as an airplane, building, or a car. Further thickeners are clays, silica and acrylic derivatives. The coating remover may further contain a surfactant, preferably biodegradable, at about 1–5% by weight, such as sodium oleate, linear alkyl ethoxylate, or petroleum sulfonate, especially for ease of rinsing off large objects. A stabilizer such as monosodium phosphate and disodium phosphate may be present in the acid peroxide stock solution. The purpose of the stabilizer is to increase the stability of peroxide and extend the shelf life of the peroxide/acid stock solution. A stabilizer is therefore, preferably included in this stock solution rather than the alkaline stock solution. A chelator, such as EDTA, phosphonate, or pentasodium salt may be present in the acid peroxide solution, especially when a heavy metal is not the catalyst. A chelator binds cations that may affect the action of the peroxide. Peroxide is an activator present at about 1–30% by weight in all of the coating removers of the present invention. Activators break chemical bonds in polymers by hydrolysis, ester interchange, oxidation or reduction. Supplementary activators at 0.1–10% by weight, such as aqueous ammonia, formic acid, lactic acid, acetic acid, or sodium hydroxide, may be included. A corrosion inhibitor at about 0.01–2.0% by weight protects an exposed surface from being damaged by the coating remover compositions provided herein. A corrosion inhibitor may be a thiourea, phosphate, silicate, waxy sulfonate, or a waxy amine, for example, and is preferably present in the alkaline stock solution.

Further thickeners, surfactants, stabilizers, chelators, activators, and corrosion inhibitors known to one of skill in this art are listed in U.S. Pat. No. 5,215,675, which reference is incorporated herein by reference for this purpose, and may be used in compositions of the present invention. The thickener and surfactant may be present in either stock solution, or present in both stock solutions.

Low-vapor pressure solvents that are biodegradable and resistant to oxidation may be present in the coating remover at about 2–60% by weight; examples include benzyl alcohol, butyrolactone, dibasic esters, N-methylpyrrolidone, diethylacetamide, hexylene glycol, and high flash point esters, such as ketones, glycol ethers and hydrocarbons. Water is used as a co-solvent to reduce flammability and reduce the waste burden on the environment. An evaporation retardant may be included at about 0.01–1.0% by weight in the compositions of the present invention and may be a petroleum wax, cetyl alcohol, a fatty amide, or an oxidized petroleum wax, for example. Individual agents added to a coating remover composition must be nonreactive to the other ingredients, or react to form a stable entity to provide a coating remover with a usable shelf life.

A preferred acid peroxide stock solution is selected from the group consisting of A or B of Table I. A preferred alkaline stock solution is selected from the group consisting of C, D, or E of Table II. A preferred peroxide solution having a pH of about 6.5 to 11.0 is selected from the group consisting of AC, AD, AB, BC, BD, or BE of Table III.

Another aspect of the present invention is a peroxide solution having a pH of about 6.5 to 11.0 capable of softening-to-release a polymeric coating when applied to said coating, the peroxide solution made by a process of mixing an acid peroxide stock solution with an alkaline stock solution containing an oxidation catalyst.

A further aspect of the present invention is a method of rendering a polymeric coating on a surface softened-to-release. The method comprises the steps of i) mixing an acid peroxide solution with an alkaline solution containing an oxidation catalyst to form a peroxide solution having a pH of about 6.5 to 11.0, and ii) immediately applying the peroxide solution having a pH of about 6.5 to 11.0 to the surface wherein the polymeric coating is rendered softened-to-release. The peroxide solution having a pH of about 6.5 to 11.0 may further contain a thickener, surfactant, stabilizer, chelator, activator, corrosion inhibitor, or the like as described hereinabove.

The mixing and the applying steps are carried out at controlled and equal rates. The mixing is in sufficiently small volumes to prevent hazardous generation of heat and gases, and occurs in line in a 0.5 inch or less diameter tube and at a rate of less than about 5 gallons per minute. A preferable rate is about 2 gallons per minute. Further, the mixing is at ambient temperature, preferably at about 15° C. to 30° C., more preferably at 20° C. to 25° C., and most preferably at about 22° C. to 24° C. The mixture is useful for up to about 24 hours. For removal of a coating on small objects, an immersion tank may be used, however, in volumes over 1 gallon, the peroxide containing liquid must be metered in continuously during stripping to maintain a 1–10% peroxide content.

The above-described method may further comprise a step of removing the softened-to-release coating by washing with water, blowing with air, cornstarch, plastic media, or may be removed by mechanical means, such as rubbing or wiping.

In an aspect of the invention, the surface is an airplane, a car, or a building, and in those cases, the peroxide solution preferably contains a thickener, such as hydroxypropyl cellulose. Where the softened-to-release paint is removed by washing with water, it is preferable for the stripper composition to contain a surfactant, such as described hereinabove.

The present compositions and methods produce minimal amounts of acids by oxidation of solvents, thickeners, evaporation retardants, activators, and inhibitors, in order to minimize the corrosion of metals, such as aluminum, or steel. The present invention also achieves an alkaline solution during use, using environmentally acceptable ingredients to minimize corrosion, and uses peroxide and oxidizable materials in a manner which avoids explosions or reaction conditions which may be hazardous.

A further advantage of the present invention is that the shelf life of the stock peroxide/acid component is significantly longer than that of prior art compositions, and the final coating remover has greater activity for oxidation of coatings. For example, a peroxide/acid stock solution has been in storage for over three months, has a peroxide content of about 16%, and is still active when combined with an alkaline stock solution. The stability of the stock peroxide/acid solution can be measured by measuring the pH of the solution since degradation leads to acid formation, or by measuring peroxide content as described in the examples. A greater shelf life means that the compositions are stable for shipping and storage.

Following long-standing patent law convention, the terms "a" and "an" mean "one or more" when used in this application, including the claims.

BRIEF DESCRIPTION OF THE DRAWINGS

The following drawing forms part of the present specification and is included to further demonstrate certain aspects of the present invention. The invention may be better understood by reference to the drawing in combination with the detailed description of specific embodiments presented herein.

The drawing illustrates two stock solutions 10 and 20 being pumped by a proportioning pump 70 through check valves 30, inlets 40, outlets 80, and a second set of check valves 30 to a "mixing" wand 50 where the solutions are mixed by a static mixer and immediately applied to the object 60 to be stripped of coating.

DETAILED DESCRIPTION OF THE PREFERRED EMBODIMENTS

Hydrogen peroxide decomposes with time and oxidizes most organic materials, depending on the conditions of contact. The present invention provides compositions and methods that balance the rate of reaction of peroxide in storage against reactivity for coating removal by blending two stock solutions at the same rate as the rate of application to the surface being stripped. Stable solutions are required in storage, whereas highly unstable peroxide is required for efficient coating removal. Viscosity control, rate of corrosion of metals, and avoidance of extreme pressures are also controlled by the compositions and methods of the present invention.

Peroxide/Acid Stock Solution for Making a Coating Remover

Table I provides ingredients for making a peroxide/acid stock solution that is mixed with an alkaline stock solution described below to form a coating remover composition of the present invention. The ingredients listed in Table I were mixed at ambient temperature until the solution was homogenous.

An advantage of this stock solution is that the peroxide is stable to degradation, solutions that have been stored for over three months are active. Stability can be measured by measuring the pH of the solution since oxidation of peroxide yields acids; by measuring peroxide content by iodine titration or permanganate titration; or by measuring oxygen content.

TABLE I

PEROXIDE ACID STOCK SOLUTION FOR A COATING REMOVER

| | Percent By Weight | |
|---|---|---|
| Ingredient | A | B |
| Water | 0.40 | 7.50 |
| Sodium Ethylenediamine Tetra Acetate | 0.50 | 0.50 |
| Phosphoric Acid 75% | 0.10 | 1.00 |
| γ Butyrolactone | 16.00 | — |
| Hexylene Glycol | 30.00 | — |
| N-Methyl-2-Pyrrolidone | — | 10.00 |
| Benzyl Alcohol | 10.00 | 30.00 |
| Klucel H | 1.00 | 1.00 |
| Formic Acid | 2.00 | — |
| Hydrogen Peroxide, 50% | 40.00 (20% final peroxide conc.) 100% | 50.00 (25% final peroxide conc.) 100% |

The pH of each solution of Table 1 is adjusted to 3.5–5.5 by addition of a base such as sodium hydroxide as required.

Alkaline Stock Solution for Making a Coating Remover

Table II provides ingredients for the alkaline stock solution that is mixed with a peroxide/acidic stock solution described hereinabove to form the coating remover composition of the present invention. The ingredients listed in Table II were mixed at ambient temperature until the solution was homogenous.

TABLE II

ALKALINE STOCK SOLUTION FOR A COATING REMOVER

| | Percent By Weight | | |
|---|---|---|---|
| Ingredient | C | D | E |
| Water | 5.00 | 13.16 | 25.36 |
| Dibasic Esters | 10.00 | — | — |
| Hexylene Glycol | 40.00 | 20.00 | — |
| Ethylene Glycol Phenyl Ether | — | 10.00 | 10.00 |
| Benzyl Alcohol | 31.00 | 35.00 | 20.00 |
| N-Methyl-2-Pyrrolidone | 4.36 | 11.00 | 35.00 |
| Klucel H | 1.00 | 1.00 | 1.00 |
| Sodium Silicate | — | 0.20 | 0.40 |
| Petroleum Sulfonate | 4.00 | — | — |
| Dibutyl Thiourea | 0.20 | 0.20 | 0.20 |
| Sodium Molybdate | 0.20 | 0.20 | 0.20 |

TABLE II-continued

ALKALINE STOCK SOLUTION FOR A COATING REMOVER

| | Percent By Weight | | |
|---|---|---|---|
| Ingredient | C | D | E |
| Manganese Sulfate | 0.04 | 0.04 | 0.04 |
| Linear Alkyl Ethoxylate | — | 4.00 | 2.00 |
| Sodium Oleate | — | 1.00 | 1.00 |
| Cetyl Alcohol | — | 0.10 | 0.40 |
| Paraffin Wax | 0.20 | — | — |
| Aqua Ammonia | 4.00 | 4.00 | 4.00 |
| Sodium Hydroxide | — | 0.10 | 0.40 |
| | 100% | 100% | 100% |
| pH[1.] | 9.0–10.0 | 10.5–11.5 | 10.5–11.5 |

[1.]Adjusted with phosphoric acid or sodium hydroxide

Mixing a Peroxide/Acid Stock Solution with an Alkaline Stock Solution to form a Coating Remover The present example provides preferred embodiments for mixing a peroxide/acidic stock solution and an alkaline stock solution to form a coating remover composition of the present invention.

In a preferred embodiment, the stock solutions are mixed immediately at the time of spraying onto the object to be stripped of coating. A plural component proportioning pump model 207–811 or 208–851, Series E, made by GRACO, INC. (Minneapolis, Minn.) is an example of a proportioning pump that may be used to pump the separate components of the coating remover of the present invention to a mixing wand. A mixing wand may contain a check valve, a V-block, a static mixer, and a wand with a spray tip. The mix ratio may be 1:1, 2:1 or even up to 18:1. For mix ratios other than 1:1, concentrations of stock components would be adjusted accordingly. An optimal rate of application is envisioned to be about 0.2–2 gallons per minute, however, one skilled in the art in light of the present disclosure would realize that rates of application up to about 5 gallons per minute would be possible. The drawing illustrates two stock solutions 10 and 20 being pumped by a proportioning pump 70 through check valves 30, inlets 40, outlets 80, and a second set of check valves 30 to a "mixing" wand 50 where the solutions are mixed by a static mixer and immediately applied to the object 60 to be stripped of coating.

For small articles, the stock solutions may be combined and stirred to homogeneity. The article may be immersed in the coating remover bath for a time sufficient to soften-to-release the coating. A volume of a gallon has been mixed and used safely.

Table III provides % by weight compositions for six exemplary coating remover compositions of the present invention.

TABLE III

MIXTURES AS APPLIED TO THE SURFACE TO BE STRIPPED

| | % BY WEIGHT | | | | | | Effective Concentration |
|---|---|---|---|---|---|---|---|
| INGREDIENT | AC | AD | AE | BC | BD | BE | % by Weight |
| SOLVENTS | | | | | | | |
| Water | 2.70 | 6.78 | 12.88 | 6.25 | 10.33 | 16.43 | 2–30 |
| γ Butyrolactone | 8.00 | 8.00 | 8.00 | — | — | — | 5–20 |
| N-Methyl-2-Pyrrolidone | 2.18 | 5.50 | 17.50 | 7.18 | 10.50 | 22.50 | 2–60 |

TABLE III-continued

MIXTURES AS APPLIED TO THE SURFACE TO BE STRIPPED

| | % BY WEIGHT | | | | | | Effective Concentration |
|---|---|---|---|---|---|---|---|
| INGREDIENT | AC | AD | AE | BC | BD | BE | % by Weight |
| Benzyl Alcohol | 20.50 | 22.50 | 15.00 | 30.50 | 32.50 | 25.00 | 5–60 |
| Ethylene Glycol Phenyl Ether | — | 5.00 | 5.00 | — | 5.00 | 5.00 | 5–60 |
| Dibasic Esters | 5.0 | — | — | 5.0 | — | — | 2–20 |
| Hexylene Glycol | 35.00 | 25.00 | 15.00 | 20.00 | 10.00 | — | 5–60 |
| THICKENER | | | | | | | |
| Klucel H | 1.00 | 1.00 | 1.00 | 1.00 | 1.00 | 1.00 | 0.5–1.5 |
| EVAPORATION RETARDANTS | | | | | | | |
| Paraffin Wax | 0.10 | — | — | 0.10 | — | — | 0.01–1.00 |
| Cetyl Alcohol | — | 0.05 | 0.20 | — | 0.05 | 0.20 | 0.01–1.00 |
| SURFACTANTS | | | | | | | |
| Sodium Oleate | — | 0.50 | 0.50 | — | 0.50 | 0.50 | 1–5 |
| Linear Alkyl Ethoxylate | — | 2.00 | 1.00 | — | 2.00 | 1.00 | 1–5 |
| Petroleum Sulfonate | 2.00 | — | — | 2.00 | — | — | 1–5 |
| INHIBITORS | | | | | | | |
| Dibutyl Thiourea | 0.10 | 0.10 | 0.10 | 0.10 | 0.10 | 0.10 | 0.01–0.50 |
| Sodium Silicate | — | 0.10 | 0.20 | — | 0.10 | 0.20 | 0.1–1.0 |
| PEROXIDE STABILIZER | | | | | | | |
| Phosphoric Acid | 0.05 | 0.05 | 0.05 | 0.5 | 0.50 | 0.50 | 0.1–1.0 |
| Ethylene Diamine Tetra Acetate | 0.25 | 0.25 | 0.25 | 0.25 | 0.25 | 0.25 | 0.01–2.0 |
| CATALYSTS | | | | | | | |
| Sodium Molybdate | 0.10 | 0.10 | 0.10 | 0.10 | 0.10 | 0.10 | ABOVE 0.01 |
| Manganese Sulfate | 0.02 | 0.02 | 0.02 | 0.02 | 0.02 | 0.02 | ABOVE 0.01 |
| ACTIVATORS | | | | | | | |
| Aqua Ammonia | 2.00 | 2.00 | 2.00 | 2.00 | 2.00 | 2.00 | 1–10 |
| Hydrogen Perozide (50% active) | 20.00 | 20.00 | 20.00 | 25.00 | 25.00 | 25.00 | 3–60% of the 50% |
| Formic Acid (90% active) | 1.0 | 1.0 | 1.0 | — | — | — | 0.5–10 |
| Sodium Hydroxide | — | 0.05 | 0.20 | — | 0.05 | 0.20 | 0.1–0.5 |
| | 100.00 | 100.00 | 100.00 | 100.00 | 100.00 | 100.00 | |
| pH of Mixture | 7.0–8.5 | 7.5–9.5 | 7.5–9.5 | 7.0–8.5 | 7.5–9.5 | 7.5–9.5 | |

Paint Stripping Results

The present example provides results obtained using the coating remover compositions of the present invention to remove paint from aluminum surfaces.

The two stock solutions (100 ml of each) were thoroughly mixed with a spatula and applied to paint films on flat aluminum surfaces. The paint panels were then placed at a 45° angle to the vertical, with the stripper to the upper side. Removal time was noted by gentle scraping to determine if the coating was completely released to bare metal.

TABLE IV

Time in Hours for Softening-to-Release Various Paints[1]

| | Mixtures and Controls as Applied to Surfaces | | | | | | | | |
|---|---|---|---|---|---|---|---|---|---|
| Paint to be Removed | C | D | E | AC | AD | AE | BC | BD | BE |
| Grumman Polyurethane Top Coat on Polysulfide Primer | 8+ | 8+ | 8+ | 7 | 5 | 7 | 7 | 5 | 7 |
| KOROFLEX Primer | 8+ | 8+ | 8+ | 2 | 4 | 7 | 2 | 4 | 7 |
| Beechcraft Polyurethane with Epoxy Primer | 8+ | 8+ | 8+ | 7 | 5 | 1 | 7 | 4 | 2 |
| Aged C-130 Aircraft Paint Polyurethane Top Coat with KOROFLEX Primer | 8+ | 8+ | 8+ | 4 | 3 | 2 | 4 | 3 | 3 |

[1]Controls are C, D and E. Coating remover compositions (AC, AD, AE, BC, BD, BE) were mixed in equal volumes and poured onto a panel at about 24° C. The stripping time is judged by gentle scraping to determine if the coating was completely released to bare metal.

As seen in Table IV, compositions of the paint stripper work at different rates on the various paints. The two-part peroxide paint remover of this invention achieves a pH of about 6.5 to 11.0 when applied, which is optimum for oxidation of paint films. This pH is also the least corrosive range for aluminum, steel and cadmium. Oxidation of organic material produces acids which may be corrosive to metals. Acids which may have been generated in the peroxide solution are neutralized by the alkaline solution. Catalysts, such as manganese sulfate and sodium molybdate, are contained in the alkaline stock so that initiation of oxidation reaction on paint polymers occurs just prior to application on the paint surface.

All of the compositions and methods disclosed and claimed herein can be made and executed without undue experimentation in light of the present disclosure. While the compositions and methods of this invention have been described in terms of preferred embodiments, it will be apparent to those of skill in the art that variations may be applied to the composition, methods and in the steps or in the sequence of steps of the method described herein without departing from the concept, spirit and scope of the invention. More specifically, it will be apparent that certain agents which are chemically related may be substituted for the agents described herein while the same or similar results would be achieved. All such similar substitutes and modifications apparent to those skilled in the art are deemed to be within the spirit, scope and concept of the invention as defined by the appended claims.

What is claimed is:

1. A method of rendering a polymeric coating on a surface softened-to-release at about ambient temperature, the method comprising the step of applying a composition comprising hydrogen peroxide or organic peroxide, benzyl alcohol, N-methyl pyrrolidone, water, a corrosion inhibitor, and a thickener; the said composition having a pH of about 6.5 to about 11.0 thereby having minimal corrosiveness during use, to the surface wherein the polymeric coating is rendered softened-to-release.

2. The method of claim 1 wherein the surface is a surface of an airplane.

3. The method of claim 1 further comprising a step of removing the softened-to-release coating.

4. A method of rendering a polymeric coating on a surface softened-to-release at about ambient temperature, the method comprising the steps of:

mixing an acid peroxide stock solution with an alkaline stock solution containing an oxidation catalyst to form a peroxide solution comprising hydrogen peroxide or organic peroxide, benzyl alcohol, N-methyl pyrrolidone, water, a corrosion inhibitor, and a thickener; the said peroxide solution having a pH of about 6.5 to about 11.0 thereby having minimal corrosiveness during use; and immediately applying the peroxide solution having a pH of about 6.5 to about 11.0 to the surface wherein the polymeric coating is rendered softened-to-release.

5. The method of claim 4 wherein the peroxide solution further contains a surfactant.

6. The method of claim 4 where the mixing step and the applying step are carried out at equal rates.

7. The method of claim 4 wherein the mixing occurs in line in a 0.5 inch or less diameter tube and at a rate of less than 5 gallons per minute.

8. The method of claim 4 wherein the peroxide solution having a pH of about 6.5 to about 11.0 is selected from the group consisting of AC, AD, AE, BC, BD, and BE as follows

| INGREDIENT | % BY WEIGHT | | | | | |
|---|---|---|---|---|---|---|
| | AC | AD | AE | BC | BD | BE |
| Water | 2.70 | 6.78 | 12.88 | 6.25 | 10.33 | 16.43 |
| γ Butyrolactone | 8.00 | 8.00 | 8.00 | — | — | — |
| N-Methyl-2-Pyrrolidone | 2.18 | 5.50 | 17.50 | 7.18 | 10.50 | 22.50 |
| Benzyl Alcohol | 20.50 | 22.50 | 15.00 | 30.50 | 32.50 | 25.00 |
| Ethylene Glycol Phenyl Ether | — | 5.00 | 5.00 | — | 5.00 | 5.00 |
| Dibasic Esters | 5.0 | — | — | 5.0 | — | — |
| Hexylene Glycol | 35.00 | 25.00 | 15.00 | 20.00 | 10.00 | — |
| Klucel H | 1.00 | 1.00 | 1.00 | 1.00 | 1.00 | 1.00 |
| Paraffin Wax | 0.10 | — | — | 0.10 | — | — |
| Cetyl Alcohol | — | 0.05 | 0.20 | — | 0.05 | 0.20 |
| Sodium Oleate | — | 0.50 | 0.50 | — | 0.50 | 0.50 |
| Linear Alkyl Ethoxylate | — | 2.00 | 1.00 | — | 2.00 | 1.00 |
| Petroleum Sulfonate | 2.00 | — | — | 2.00 | — | — |
| Dibutyl Thiourea | 0.10 | 0.10 | 0.10 | 0.10 | 0.10 | 0.10 |
| Sodium Silicate | — | 0.10 | 0.20 | — | 0.10 | 0.20 |
| Phosphoric Acid | 0.05 | 0.05 | 0.05 | 0.5 | 0.50 | 0.50 |
| Ethylene Diamine Tetra Acetate | 0.25 | 0.25 | 0.25 | 0.25 | 0.25 | 0.25 |
| Sodium Molybdate | 0.10 | 0.10 | 0.10 | 0.10 | 0.10 | 0.10 |
| Manganese Sulfate | 0.02 | 0.02 | 0.02 | 0.02 | 0.02 | 0.02 |
| Aqua Ammonia | 2.00 | 2.00 | 2.00 | 2.00 | 2.00 | 2.00 |
| Hydrogen Peroxide (50% active) | 20.00 | 20.00 | 20.00 | 25.00 | 25.00 | 25.00 |
| Formic Acid (90% active) | 1.0 | 1.0 | 1.0 | — | — | — |
| Sodium Hydroxide | — | 0.05 | 0.20 | — | 0.05 | 0.20 |
| pH of Mixture | 7.0–8.5 | 7.5–9.5. | 7.5–9.5 | 7.0–8.5 | 7.5–9.5 | 7.5–9.5 |

9. The method of claim 4 where the polymeric coating is paint, varnish, enamel, a sealant, or lacquer.

10. The method of claim 4 where the peroxide solution contains a stabilizer or a chelator.

11. The method of claim 4 wherein the acid peroxide stock solution contains hydrogen peroxide, or methyl ethyl ketone peroxide.

12. The method of claim 4 where the acid peroxide stock solution is selected from the group consisting of A and B as follows

| | Percent By Weight | |
|---|---|---|
| Ingredient | A | B |
| Water | 0.40 | 7.50 |
| Sodium Ethylenediamine Tetra Acetate | 0.50 | 0.50 |
| Phosphoric Acid 75% | 0.10 | 1.00 |
| γ Butyrolactone | 16.00 | — |
| Hexylene Glycol | 30.00 | — |
| N-Methyl-2-Pyrrolidone | — | 10.00 |
| Benzyl Alcohol | 10.00 | 30.00 |
| Klucel H | 1.00 | 1.00 |
| Formic Acid | 2.00 | — |
| Hydrogen Peroxide, 50% | 40.00 (20% final peroxide conc.) | 50.00 (25% final peroxide conc.). |

13. The method of claim 4 where the peroxide solution further contains a supplementary activator.

14. The method of claim 4 where the alkaline stock solution is selected from the group consisting of C, D, and E as follows

|  | Percent By Weight | | |
| --- | --- | --- | --- |
| Ingredient | C | D | E |
| Water | 5.00 | 13.16 | 25.36 |
| Dibasic Esters | 10.00 | — | — |
| Hexylene Glycol | 40.00 | 20.00 | — |
| Ethylene Glycol Phenyl Ether | — | 10.00 | 10.00 |
| Benzyl Alcohol | 31.00 | 35.00 | 20.00 |
| N-Methyl-2-Pyrrolidone | 4.36 | 11.00 | 35.00 |
| Klucel H | 1.00 | 1.00 | 1.00 |
| Sodium Silicate | — | 0.20 | 0.40 |
| Petroleum Sulfonate | 4.00 | — | — |
| Dibutyl Thiourea | 0.20 | 0.20 | 0.20 |
| Sodium Molybdate | 0.20 | 0.20 | 0.20 |
| Manganese Sulfate | 0.04 | 0.04 | 0.04 |
| Linear Alkyl Ethoxylate | — | 4.00 | 2.00 |
| Sodium Oleate | — | 1.00 | 1.00 |
| Cetyl Alcohol | — | 0.10 | 0.40 |
| Paraffin Wax | 0.20 | — | — |
| Aqua Ammonia | 4.00 | 4.00 | 4.00 |
| Sodium Hydroxide | — | 0.10 | 0.40 |
| pH | 9.0–10.0 | 10.5–11.5 | 10.5–11.5. |

15. The method of claim 4 where the oxidation catalyst is sodium molybdate, or manganese sulfate.

16. The method of claim 4 further comprising a step of removing the softened-to-release coating.

17. The method of claim 16 where removing the softened-to-release coating from the surface is with water, air or cornstarch.

18. A method of softening paint to release at about ambient temperature from a surface of an airplane or a car, the method comprising the steps of:
mixing an acid peroxide stock solution with an alkaline stock solution containing an oxidation catalyst to form a peroxide solution comprising hydrogen peroxide or organic peroxide, benzyl alcohol, N-methyl pyrrolidone, water, a corrosion inhibitor, and a thickener; the said peroxide solution having a pH of about 6.5 to about 11.0 thereby having minimal corrosiveness during use; and
immediately applying the peroxide solution having a pH of about 6.5 to about 11.0 to the surface of the airplane or the car to render the paint softened-to-release.

19. The method of claim 18 further comprising the step of washing the softened-to-release paint from the surface of the airplane or the car with water.

20. The method of claim 18 wherein the peroxide solution further contains a surfactant.

21. The method of claim 18 wherein the mixing occurs in line in a 0.5 inch or less diameter tube and at a rate of less than 5 gallons per minute.

22. The method of claim 18 wherein the peroxide solution having a pH of about 6.5 to about 11.0 is selected from the group consisting of AC, AD, AE, BC, BD, and BE as follows

|  | % BY WEIGHT | | | | | |
| --- | --- | --- | --- | --- | --- | --- |
| INGREDIENT | AC | AD | AE | BC | BD | BE |
| Water | 2.70 | 6.78 | 12.88 | 6.25 | 10.33 | 16.43 |
| γ Butyrolactone | 8.00 | 8.00 | 8.00 | — | — | — |
| N-Methyl-2-Pyrrolidone | 2.18 | 5.50 | 17.50 | 7.18 | 10.50 | 22.50 |
| Benzyl Alcohol | 20.50 | 22.50 | 15.00 | 30.50 | 32.50 | 25.00 |
| Ethylene Glycol Phenyl Ether | — | 5.00 | 5.00 | — | 5.00 | 5.00 |
| Dibasic Esters | 5.0 | — | — | 5.0 | — | — |
| Hexylene Glycol | 35.00 | 25.00 | 15.00 | 20.00 | 10.00 | — |
| Klucel H | 1.00 | 1.00 | 1.00 | 1.00 | 1.00 | 1.00 |
| Paraffin Wax | 0.10 | — | — | 0.10 | — | — |
| Cetyl Alcohol | — | 0.05 | 0.20 | — | 0.05 | 0.20 |
| Sodium Oleate | — | 0.50 | 0.50 | — | 0.50 | 0.50 |
| Linear Alkyl Ethoxylate | — | 2.00 | 1.00 | — | 2.00 | 1.00 |
| Petroleum Sulfonate | 2.00 | — | — | 2.00 | — | — |
| Dibutyl Thiourea | 0.10 | 0.10 | 0.10 | 0.10 | 0.10 | 0.10 |
| Sodium Silicate | — | 0.10 | 0.20 | — | 0.10 | 0.20 |
| Phosphoric Acid | 0.05 | 0.05 | 0.05 | 0.5 | 0.50 | 0.50 |
| Ethylene Diamine Tetra Acetate | 0.25 | 0.25 | 0.25 | 0.25 | 0.25 | 0.25 |
| Sodium Molybdate | 0.10 | 0.10 | 0.10 | 0.10 | 0.10 | 0.10 |
| Manganese Sulfate | 0.02 | 0.02 | 0.02 | 0.02 | 0.02 | 0.02 |
| Aqua Ammonia | 2.00 | 2.00 | 2.00 | 2.00 | 2.00 | 2.00 |
| Hydrogen Peroxide (50% active) | 20.00 | 20.00 | 20.00 | 25.00 | 25.00 | 25.00 |
| Formic Acid (90% active) | 1.0 | 1.0 | 1.0 | — | — | — |
| Sodium Hydroxide | — | 0.05 | 0.20 | — | 0.05 | 0.20 |
| pH of Mixture | 7.0–8.5 | 7.5–9.5 | 7.5–9.5 | 7.0–8.5. | 7.5–9.5 | 7.5–9.5 |

\* \* \* \* \*